(12) United States Patent
Lee (10) Patent No.: US 9,558,338 B2
(45) Date of Patent: Jan. 31, 2017

(54) METHOD AND APPARATUS FOR PERFORMING SECURITY CONTROL BY USING CAPTURED IMAGE

(71) Applicant: HTC Corporation, Taoyuan County (TW)

(72) Inventor: Tsung-Yin Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 298 days.

(21) Appl. No.: 13/670,472

(22) Filed: Nov. 7, 2012

(65) Prior Publication Data

US 2014/0129646 A1    May 8, 2014

(51) Int. Cl.
  *G06F 21/36* (2013.01)
  *G06F 21/60* (2013.01)
  (Continued)

(52) U.S. Cl.
  CPC ............... *G06F 21/36* (2013.01); *G06F 21/31* (2013.01); *G06F 21/60* (2013.01); *G06F 21/88* (2013.01);
  (Continued)

(58) Field of Classification Search
  None
  See application file for complete search history.

(56) References Cited

U.S. PATENT DOCUMENTS 8,311,513 B1 * 11/2012 Nasserbakht ........ G06Q 10/109
  455/410
8,634,808 B1 * 1/2014 Zhong ..................... H04M 1/66
  340/5.8

(Continued)

FOREIGN PATENT DOCUMENTS

CN    101141722 A    3/2008
CN    101207859 A    6/2008
  (Continued)

OTHER PUBLICATIONS

Simao AM, Sicoli FC, de Melo LP, de Deus FE, de Sousa Junior RT. Acquisition of digital evidence in android smartphones. In9th Australian Digital Forensics Conference 2011 (p. 116).*
  (Continued)

*Primary Examiner* — Ranodhi Serrao
*Assistant Examiner* — James Fiorillo
(74) *Attorney, Agent, or Firm* — Winston Hsu; Scott Margo (57) ABSTRACT

A method for performing security control includes selectively controlling at least one camera module of an electronic device to capture at least one image and outputting the at least one image, for security of the electronic device. For example, the method includes: activating a screen lock function that is associated with a password; and when it is detected that a string that differs from the password is entered, controlling the module to capture the image and outputting the image. In another example, the method includes: activating a remote control function, allowing the electronic device to be remotely controlled, through at least one of a telecommunication network and a wireless local area network, by an application that runs on a processor of another electronic device; and based upon remote control of the application, controlling the camera module to capture the image and outputting the image. An associated apparatus is also provided.

31 Claims, 7 Drawing Sheets

(51) Int. Cl.
  *H04L 12/58*   (2006.01)
  *G06F 21/31*   (2013.01)
  *G06F 21/88*   (2013.01)
  *H04W 12/12*   (2009.01)
  *G06F 21/30*   (2013.01)

(52) U.S. Cl.
  CPC .............. *H04L 51/08* (2013.01); *H04W 12/12* (2013.01); *G06F 21/305* (2013.01)

(56) References Cited

U.S. PATENT DOCUMENTS

| | | | | |
|---|---|---|---|---|
| 8,868,036 | B1* | 10/2014 | Nasserbakht | G06Q 10/109 455/410 |
| 2003/0215114 | A1* | 11/2003 | Kyle | G06F 21/32 382/115 |
| 2006/0288234 | A1* | 12/2006 | Azar | G06F 21/32 713/186 |
| 2008/0001703 | A1* | 1/2008 | Goto | H04M 1/0243 340/5.8 |
| 2008/0189370 | A1* | 8/2008 | Adams | H04L 51/08 709/206 |
| 2010/0064341 | A1* | 3/2010 | Aldera | H04L 63/102 726/1 |
| 2010/0216429 | A1 | 8/2010 | Mahajan | |
| 2010/0325721 | A1* | 12/2010 | Bandyopadhyay | G06F 21/316 726/19 |
| 2011/0145927 | A1* | 6/2011 | Hubner | G06F 21/31 726/26 |
| 2011/0159850 | A1* | 6/2011 | Faith | G06Q 30/0201 455/411 |
| 2012/0075452 | A1* | 3/2012 | Ferren | G02B 13/0065 348/78 |
| 2012/0083292 | A1 | 4/2012 | Yeo | |
| 2012/0147203 | A1* | 6/2012 | Cooley | G06F 21/88 348/211.3 |
| 2012/0235790 | A1* | 9/2012 | Zhao | G06F 21/32 340/5.83 |
| 2012/0240183 | A1* | 9/2012 | Sinha | H04W 12/08 726/1 |
| 2013/0078951 | A1* | 3/2013 | Mun | G06F 21/305 455/411 |
| 2013/0167212 | A1* | 6/2013 | Azar | G06F 21/32 726/7 |
| 2013/0208103 | A1* | 8/2013 | Sands | G06F 21/31 348/78 |
| 2013/0216108 | A1* | 8/2013 | Hwang | G06K 9/00221 382/118 |
| 2013/0311768 | A1* | 11/2013 | Fosmark | G06Q 20/3223 713/155 |
| 2013/0326613 | A1* | 12/2013 | Kochanski | G06F 21/32 726/19 |
| 2014/0033299 | A1* | 1/2014 | McGloin | G06F 21/60 726/18 |
| 2014/0049653 | A1* | 2/2014 | Leonard | G06T 1/0042 348/207.1 |
| 2014/0058862 | A1* | 2/2014 | Celkonas | G06Q 20/12 705/18 |
| 2014/0075502 | A1* | 3/2014 | Aissi | G06F 21/60 726/1 |
| 2014/0344918 | A1* | 11/2014 | Choi | G06F 21/88 726/16 |

FOREIGN PATENT DOCUMENTS

| | | |
|---|---|---|
| CN | 101594426 A | 12/2009 |
| CN | 101960738 A | 1/2011 |
| CN | 102687492 A | 9/2012 |
| TW | 200608762 | 3/2006 |
| TW | 201105084 | 2/2011 |
| TW | 201137658 | 11/2011 |

OTHER PUBLICATIONS

Office action mailed on Apr. 23, 2015 for the Taiwan application No. 102111969, filing date Apr. 2, 2013, p. 1 line 11-14, p. 2-10 and p. 11 line 1-13.

Office action mailed on Feb. 1, 2016 for the China application No. 201310186156.9, filing date May. 20, 2013, p. 1-14.

Office action mailed/issued on May 3, 2016 for DE application No. 102012023965.3, pp. 1-10.

Jason Mick, "Android App Take Pictures of Phone Thieves From Unlock Screen", Oct. 26, 2011, pp. 1-2, Dailytech.com. http://www.dailytech.com/Android+App+Take+Pictures+of+Phone+Thieves+From+Unlock+Screen/article23122.htm.

Office action mailed on Sep. 23, 2016 for the China application No. 201310186156.9, filed May. 20, 2013, pp. 1-14.

* cited by examiner

METHOD AND APPARATUS FOR PERFORMING SECURITY CONTROL BY USING CAPTURED IMAGE

BACKGROUND OF THE INVENTION

1. Field of the Invention

The present invention relates to security of a portable electronic device, and more particularly, to a method for performing security control, and to an associated apparatus.

2. Description of the Prior Art

A conventional portable electronic device implemented according to the related art, such as a multifunctional mobile phone equipped with personal digital assistant (PDA) functionalities or a PDA equipped with mobile phone functionalities, may have become an essential part of everyday life since it is very helpful. In a situation where the conventional portable electronic device gets lost, some problems may occur. For example, when the conventional portable electronic device is taken away by someone else, the private information stored in the conventional portable electronic device may be used (or sold) without permission. In another example, during a tour, the owner of the portable electronic device may feel troubled on determining whether to continue looking for it or give up since the conventional portable electronic device would probably locate somewhere near the owner. It seems unlikely that the conventional portable electronic device can help the owner to do something in this situation. Thus, a novel method is required for providing security control of an electronic device.

SUMMARY OF THE INVENTION

It is therefore an objective of the claimed invention to provide a method for performing security control, and to provide an associated apparatus, in order to solve the above-mentioned problems.

According to at least one preferred embodiment, a method for performing security control is provided, where the method is applied to an electronic device. The method comprises the steps of: activating a screen lock function of the electronic device based upon a trigger signal, wherein the screen lock function is associated with a checking operation for determining whether the screen lock function should be deactivated; and when a checking result of the checking operation indicates that the screen lock function should not be deactivated, controlling at least one camera module of the electronic device to capture at least one image and outputting the at least one image, for security of the electronic device. For example, in a situation where the screen lock function is associated with a password, the step of controlling the at least one camera module of the electronic device to capture the at least one image and outputting the at least one image for security of the electronic device further comprises: when it is detected that a string that differs from the password is entered to try deactivating the screen lock function, controlling the at least one camera module of the electronic device to capture the at least one image and outputting the at least one image, for security of the electronic device.

According to at least one preferred embodiment, an apparatus for performing security control is also provided, where the apparatus comprises at least one portion of an electronic device. The apparatus comprises a storage unit and a processing circuit. The storage unit is arranged to temporarily store information, and the processing circuit is arranged to control operations of the electronic device. In addition, the processing circuit is arranged to activate a screen lock function of the electronic device based upon a trigger signal, wherein the screen lock function is associated with a checking operation for determining whether the screen lock function should be deactivated. Additionally, when a checking result of the checking operation indicates that the screen lock function should not be deactivated, the processing circuit controls at least one camera module of the electronic device to capture at least one image, temporarily stores image data of the at least one image in the storage unit, and outputs the at least one image, for security of the electronic device. For example, in a situation where the screen lock function is associated with a password, when it is detected that a string that differs from the password is entered to try deactivating the screen lock function, the processing circuit controls the at least one camera module of the electronic device to capture the at least one image and outputting the at least one image, for security of the electronic device.

According to at least one preferred embodiment, a computer program product is also provided, where the computer program product has program instructions for instructing a processor to perform a method comprising the steps of: activating a screen lock function of the electronic device based upon a trigger signal, wherein the screen lock function is associated with a checking operation for determining whether the screen lock function should be deactivated, and the electronic device comprises the processor; and when a checking result of the checking operation indicates that the screen lock function should not be deactivated, controlling at least one camera module of the electronic device to capture at least one image and outputting the at least one image, for security of the electronic device. For example, in a situation where the screen lock function is associated with a password, the step of controlling the at least one camera module of the electronic device to capture the at least one image and outputting the at least one image for security of the electronic device further comprises: when it is detected that a string that differs from the password is entered to try deactivating the screen lock function, controlling the at least one camera module of the electronic device to capture the at least one image and outputting the at least one image, for security of the electronic device.

According to at least one preferred embodiment, a method for performing security control is provided, where the method is applied to an electronic device. The method comprises: activating a remote control function of the electronic device based upon a trigger signal, allowing the electronic device to be remotely controlled, through at least one of a telecommunication network and a wireless local area network, by an application that runs on a processor of another electronic device; and based upon remote control of the application that runs on the processor of the other electronic device, controlling at least one camera module of the electronic device to capture at least one image and outputting the at least one image, for security of the electronic device.

It is an advantage of the present invention that the aforementioned method, the aforementioned apparatus, and the aforementioned computer program product allow the owner of the electronic device to find the electronic device with the aid of the aforementioned at least one image received through one or more other electronic devices. In addition, the related art problems (e.g. the problem of personal information leakage, and the problem of feeling troubled on determining whether to continue looking for the lost electronic device or give up) may be prevented.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
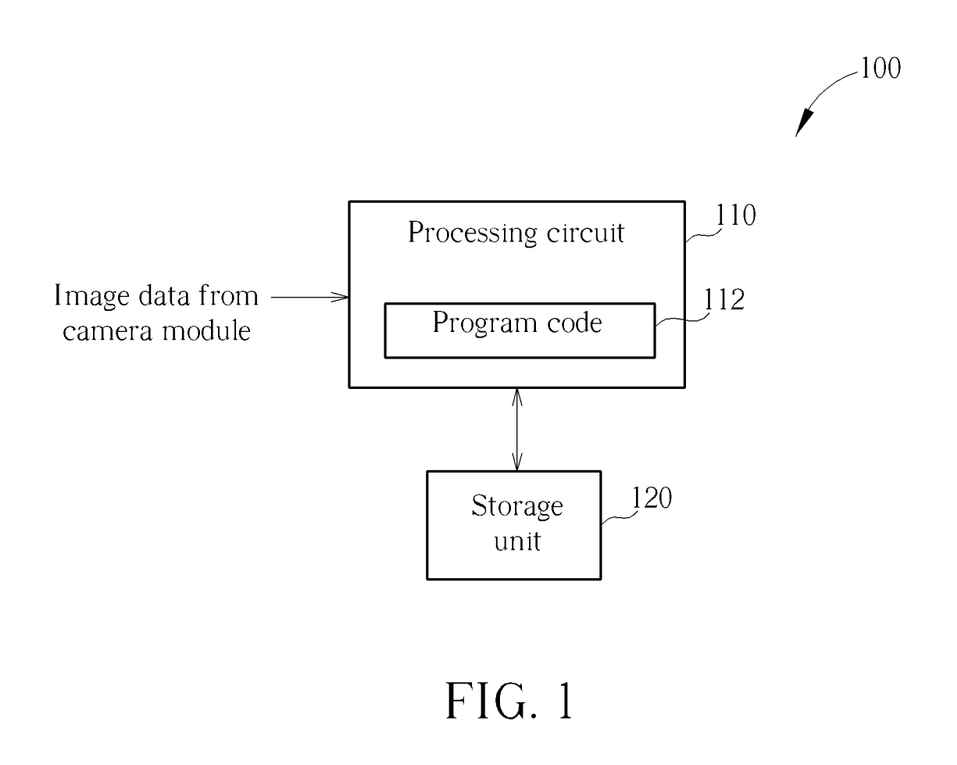
FIG. 1 is a diagram of an apparatus for performing security control according to an example.

FIG. 1 is a diagram of an apparatus 100 for performing security control according to an example, where the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. Examples of the electronic device may include, but not limited to, a mobile phone (e.g. a multifunctional mobile phone), a mobile computer (e.g. tablet computer), a personal digital assistant (PDA), and a personal computer such as a laptop computer or desktop computer.

As shown in FIG. 1, the apparatus 100 comprises a processing circuit 110 and a storage unit 120, where the processing circuit 110 is arranged to control operations of the electronic device, and the storage unit 120 is arranged to temporarily store information such as image data for the processing circuit 110. Please note that the processing circuit 110 can be selectively implemented with the mixed scheme utilizing software (or firmware) module running on hardware circuit(s), or implemented with the pure hardware scheme. For example, the processing circuit 110 may comprise a processor and associated hardware circuits implemented by using at least one printed circuit board (PCB) on which the processor can be installed, and the storage unit 120 may comprise at least one memory such as at least one random access memory (RAM) and/or at least one non-volatile memory (e.g. an electrically erasable programmable read only memory (EEPROM) or a Flash memory), where the program code 112 may be stored in the storage unit 120 in advance and retrieved by the processing circuit 110, for running on the processing circuit 110 as illustrated in FIG. 1. This is for illustrative purposes only, and is not meant to be a limitation. In another example, the processing circuit 110 may be implemented as pure hardware circuit(s), where the program code 112 is imbedded therein.

The processing circuit 110 (more particularly, the processing circuit 110 executing the program code 112 such as an application) is capable of selectively controlling at least one camera module (not shown in FIG. 1) of the electronic device to capture at least one image (e.g. one or more images), receiving image data of the aforementioned at least one image from the aforementioned at least one camera module, temporarily storing the image data of the aforementioned at least one image in the storage unit 120, and further outputting the aforementioned at least one image, for security of the electronic device.

Figure 2:
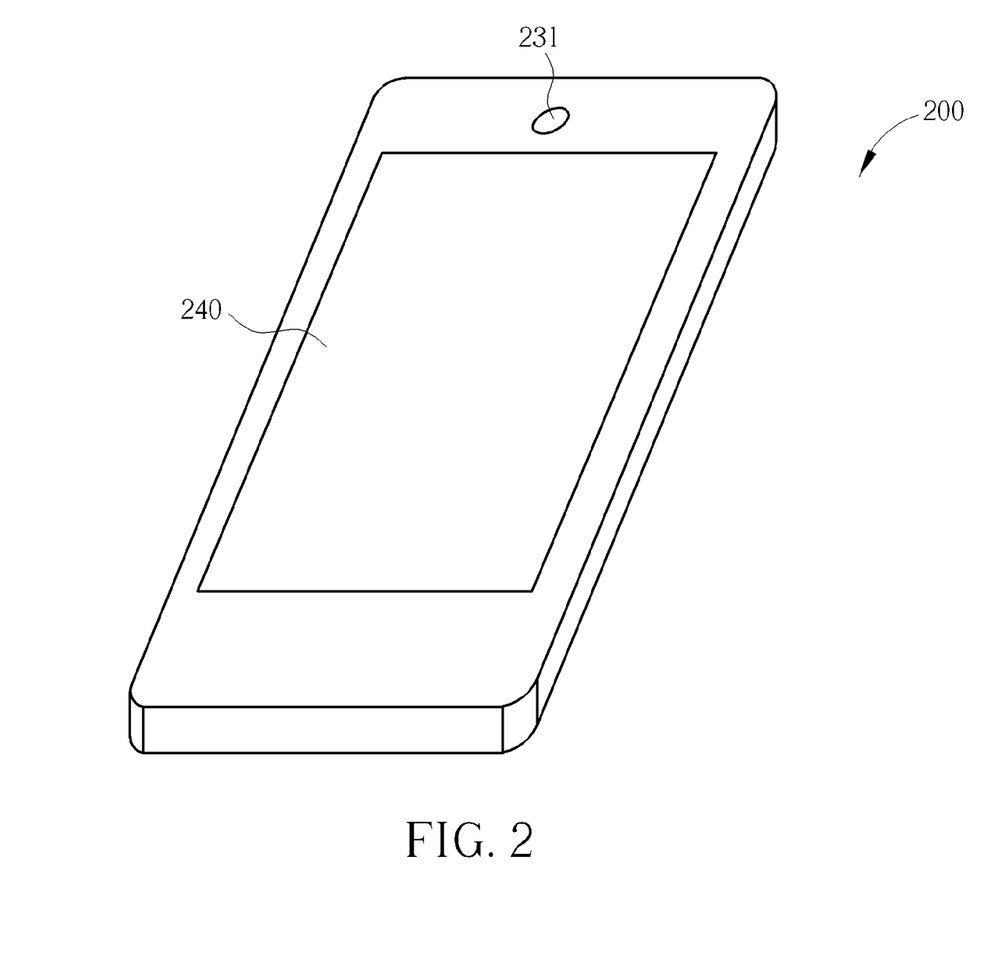
FIGS. 2-3 illustrate the apparatus shown in FIG. 1 according to an example, where the apparatus of this example is a mobile phone equipped with two camera modules.
Figure 3:
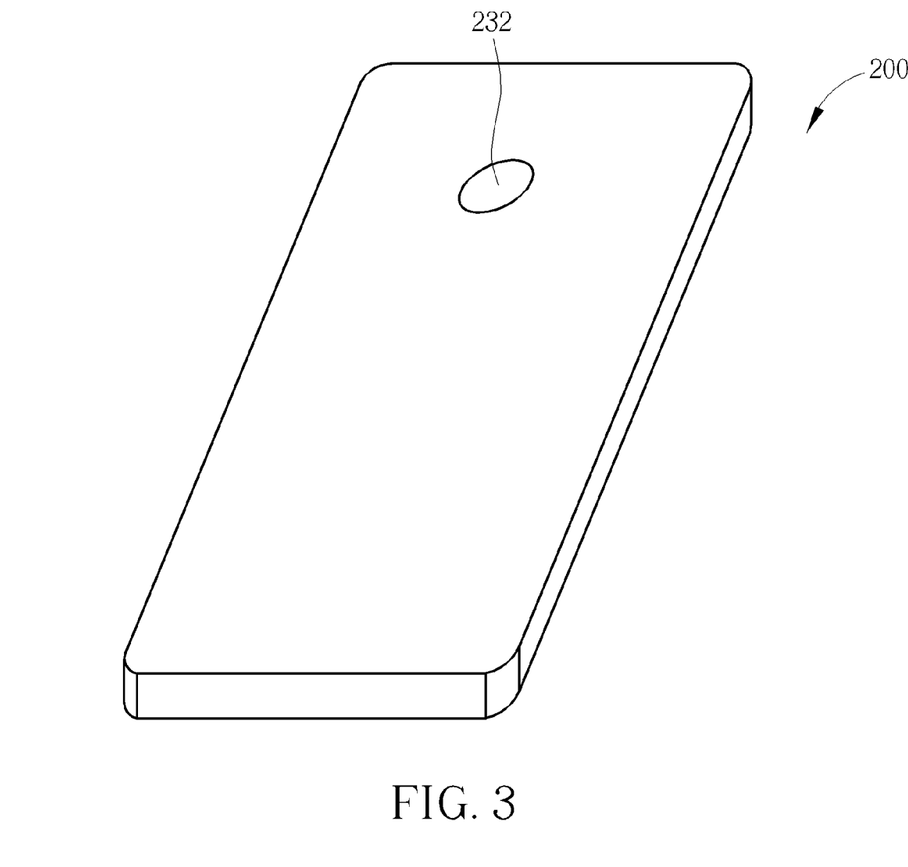

FIGS. 2-3 illustrate the apparatus 100 shown in FIG. 1 according to an example, where the apparatus 100 of this example is a mobile phone 200 equipped with two camera modules 231 and 232. In the example shown in FIGS. 2-3, the camera module 231 is a front camera module that is capable of capturing images of the surroundings in front of the mobile phone 200 (e.g. facial images of a person who is using the mobile phone 200 or is viewing something displayed on the screen 240), and the camera module 232 is a main camera module that is capable of capturing images of the surroundings at the other side of the mobile phone 200. For example, the processing circuit 110 (more particularly, the processing circuit 110 executing the program code 112 such as an application) may selectively control one or more of the camera modules 231 and 232 to capture the aforementioned at least one image (e.g. the aforementioned one or more images), for use of security control.

Figure 4:
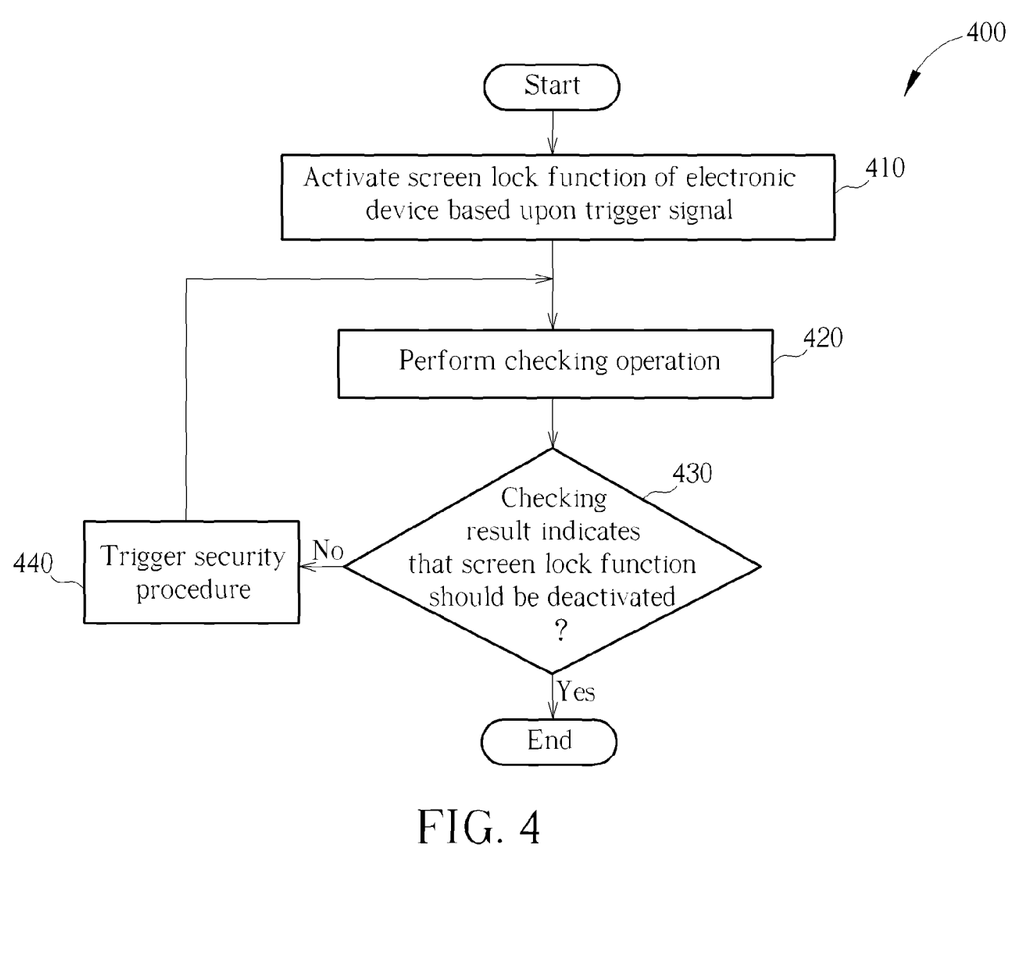
FIG. 4 illustrates a flowchart of a method for performing security control according to an example.

FIG. 4 illustrates a flowchart of a method 400 for performing security control according to an example. The method shown in FIG. 4 can be applied to the apparatus 100 shown in FIG. 1 (more particularly, the mobile phone 200 of the example shown in FIGS. 2-3), and can be applied to the processing circuit 110 thereof (more particularly, the processing circuit 110 executing the program code 112 such as the application mentioned above). For example, the program code 112 may be provided through a computer program product having program instructions for instructing a processor such as that mentioned above to perform the method 400 shown in FIG. 4, where the computer program product may be implemented as a non-transitory computer-readable medium (e.g. a floppy disk or a compact disc-read only memory (CD-ROM)) storing the program instructions or an equivalent version thereof, such as a software package for being installed. The method is described as follows.

In Step 410, the processing circuit 110 activates a screen lock function of the electronic device based upon a trigger signal, where the screen lock function is associated with a checking operation for determining whether the screen lock function should be deactivated. More particularly, the screen lock function can be associated with a password (e.g. the password "XXYYZZ"). For example, the trigger signal may be automatically generated based upon some user settings or default settings within the electronic device. Typically, the processing circuit 110 will continue locking the screen of the electronic device (e.g. the screen 240) except that at least one checking result of checking operation indicates that the screen lock function should be deactivated (e.g., in a situation where the screen lock function is associated with the password mentioned above, a string that is exactly equivalent to the password is entered). This is for illustrative purposes only, and is not meant to be a limitation. For example, the screen lock function can be associated with a predetermined drawing pattern. In another example, the screen lock function can be associated with a personal identification number (PIN) code of the electronic device.

In Step 420, the processing circuit 110 performs the aforementioned checking operation. For example, in a situation where the screen lock function is associated with the password mentioned above, the processing circuit 110 is capable of repeatedly checking whether any string is input into the electronic device to try deactivating the screen lock function, and when it is detected that a string is input into the electronic device to try deactivating the screen lock function, the processing circuit 110 checks whether the string is equivalent to the password, in order to determine whether the screen lock function should be deactivated. This is for illustrative purposes only, and is not meant to be a limitation. For example, in a situation where the screen lock function is associated with the predetermined drawing pattern mentioned above, the processing circuit 110 checks is capable of repeatedly checking whether any drawing pattern is input into the electronic device to try deactivating the screen lock function, and when it is detected that a drawing pattern is input into the electronic device to try deactivating the screen lock function, the processing circuit 110 checks whether the drawing pattern is equivalent to the predetermined drawing pattern, in order to determine whether the screen lock function should be deactivated.

In another example, in a situation where the screen lock function is associated with the PIN code mentioned above, the processing circuit 110 checks is capable of repeatedly checking whether any code is input into the electronic device to try deactivating the screen lock function, and when it is detected that a code is input into the electronic device to try deactivating the screen lock function, the processing circuit 110 checks whether the code is equivalent to the PIN code, in order to determine whether the screen lock function should be deactivated.

In some other examples, the checking operation may comprise at least one biometric checking operation, and the processing circuit 110 may utilize at least one optical input .module of the electronic device to input biometric information, for performing the aforementioned at least one biometric checking operation. More particularly, the aforementioned at least one optical input .module may comprise a front camera of the electronic device (such as that mentioned above) and a specific scanner module of the electronic device, and the aforementioned at least one biometric checking operation may comprise at least one of a face recognition operation, an iris recognition operation, a fingerprint recognition operation, and a vein recognition operation, where the processing circuit 110 is capable of utilizing the front camera to capture one or more images (more particularly, one or more images of the face of the person who is holding the electronic device, and/or one or more images of the eye(s) of the person who is holding the electronic device) for performing at least one of the face recognition operation and the iris recognition operation, and is capable of utilizing the specific scanner module to scan one or more images (more particularly, one or more images of the fingerprint(s) of the person who is holding the electronic device, and/or one or more images of the vein(s) of a specific portion of the person who is holding the electronic device, such as the vein image(s) of the hand(s) or the finger(s) of this person) for performing at least one of the fingerprint recognition operation and the vein recognition operation. Thus, if the recognized result of the aforementioned at least one biometric checking operation does not match the corresponding information that is stored in the database within the electronic device in advance, the processing circuit 110 typically determines that the screen lock function should not be deactivated.

In Step 430, the processing circuit 110 checks whether a checking result of the checking operation indicates that the screen lock function should be deactivated. When a checking result of the checking operation indicates that the screen lock function should be deactivated (e.g. in a situation where the screen lock function is associated with the password mentioned above and it is detected that the string is equivalent to the password), the working flow shown in FIG. 4 comes to the end; otherwise (i.e. a checking result of the checking operation indicates that the screen lock function should not be deactivated), Step 440 is entered.

In Step 440, the processing circuit 110 triggers a security procedure. More particularly, in a situation where the screen lock function is associated with the password mentioned above, when it is detected that a string that differs from the password (e.g. the string "xxyyzz" that differs from the password "XXYYZZ") is entered to try deactivating the screen lock function, based upon the security procedure, the processing circuit 110 controls the aforementioned at least one camera module of the electronic device, such as one or more of the camera modules 231 and 232, to capture the aforementioned at least one image, temporarily stores the aforementioned at least one image in the storage unit 120, and outputs the aforementioned at least one image, for security of the electronic device such as the mobile phone 200. This is for illustrative purposes only, and is not meant to be a limitation. For example, in a situation where the screen lock function is associated with the predetermined drawing pattern mentioned above, when it is detected that a drawing pattern that differs from the predetermined drawing pattern is input to try deactivating the screen lock function, based upon the security procedure, the processing circuit 110 controls the aforementioned at least one camera module of the electronic device, such as one or more of the camera modules 231 and 232, to capture the aforementioned at least one image, temporarily stores the aforementioned at least one image in the storage unit 120, and outputs the aforementioned at least one image, for security of the electronic device such as the mobile phone 200.

In another example, in a situation where the screen lock function is associated with the PIN code mentioned above, when it is detected that a code that differs from the PIN code is input to try deactivating the screen lock function, based upon the security procedure, the processing circuit 110 controls the aforementioned at least one camera module of the electronic device, such as one or more of the camera modules 231 and 232, to capture the aforementioned at least one image, temporarily stores the aforementioned at least one image in the storage unit 120, and outputs the aforementioned at least one image, for security of the electronic device such as the mobile phone 200.

According to the example shown in FIG. 4, based upon the security procedure, the processing circuit 110 can send an electronic mail (e-mail) thorough Internet with the aforementioned at least one image being attached to the e-mail. For example, the processing circuit 110 sends the e-mail from a first predetermined e-mail account to a second predetermined e-mail account, allowing the aforementioned at least one image to be received by utilizing the second predetermined e-mail account through another electronic device (which differs from the electronic device disclosed in the example shown in FIG. 1) such as a workstation. In another example, the processing circuit 110 sends the e-mail from the first predetermined e-mail account to the same e-mail account (i.e. the first predetermined e-mail account), allowing the aforementioned at least one image to be received by utilizing the first predetermined e-mail account through another electronic device (which differs from the electronic device disclosed in the example shown in FIG. 1) such as the workstation mentioned above. As a result, the owner of the electronic device such as the mobile phone 200 may find the electronic device with the aid of the aforementioned at least one image received through one or more other electronic devices (e.g. the workstation mentioned above).

According to a variation of the example shown in FIG. 4, in a situation where the electronic device such as the mobile phone 200 is picked up by somebody, the security procedure disclosed above can increase the probability of finding the mobile phone 200. For example, based upon the security procedure, the processing circuit 110 may display a predetermined message (e.g. the message "Please contact the owner whose e-mail address is ABC@DEF.GHI, and a gift is prepared for you. Thanks!", where "ABC@DEF.GHI" of this variation represents an e-mail address) on the screen of the electronic device (e.g. the screen 240), allowing the person who enters the string (e.g. the string "xxyyzz" that differs from the password "XXYYZZ") to be encouraged to return the electronic device to the owner of the electronic device. As a result, the owner of the electronic device such as the mobile phone 200 may find the electronic device with the aid of the security procedure.

According to another variation of the example shown in FIG. 4, in a situation where the electronic device such as the mobile phone 200 is taken away by somebody, the security procedure disclosed above can increase the probability of finding the mobile phone 200. For example, based upon the security procedure, the processing circuit 110 may display at least one portion of the aforementioned at least one image on the screen of the electronic device (e.g. the screen 240). More particularly, the processing circuit 110 displays a predetermined message (e.g. the message "Please contact the owner whose e-mail address is ABC@DEF.GHI or inform the police, thanks!", where "ABC@DEF.GHI" of this variation represents an e-mail address) on the screen 240, allowing the person who enters the string (e.g. the string "xxyyzz" that differs from the password "XXYYZZ") to simultaneously or non-simultaneously view the predetermined message and his/her own image, which can be an image within the aforementioned at least one image in this variation. As a result, the owner of the electronic device such as the mobile phone 200 may find the electronic device with the aid of the security procedure.

Figure 5:
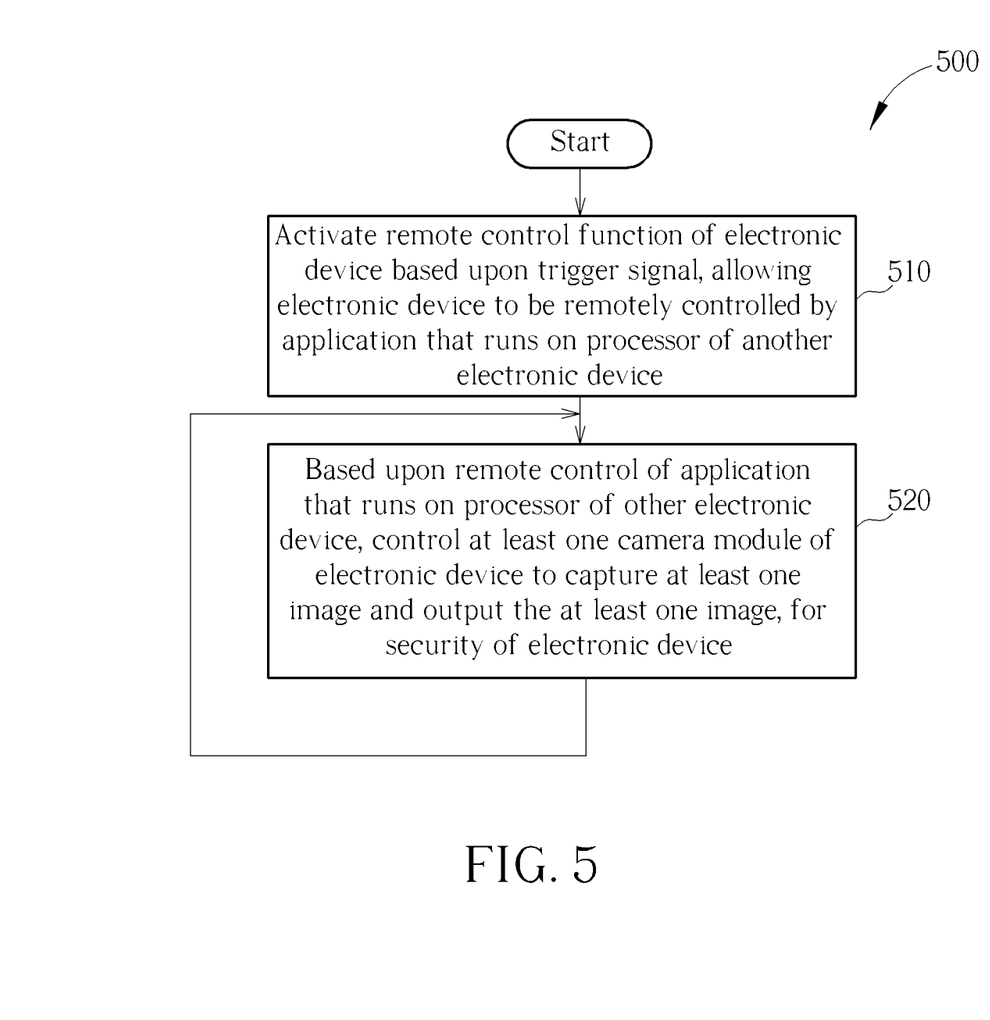
FIG. 5 illustrates a flowchart of a method for performing security control according to another example.

FIG. 5 illustrates a flowchart of a method 500 for performing security control according to another example. The method shown in FIG. 5 can be applied to the apparatus 100 shown in FIG. 1 (more particularly, the mobile phone 200 of the example shown in FIGS. 2-3). The method is described as follows.

In Step 510, the processing circuit 110 activates a remote control function of the electronic device based upon a trigger signal, allowing the electronic device to be remotely controlled, through at least one of a telecommunication network and a wireless local area network (e.g. the telecommunication network and/or the wireless local area network), by an application that runs on a processor of another electronic device, which differs from the electronic device disclosed in the example shown in FIG. 1. For example, the other electronic device can be a mobile phone (more particularly, a mobile phone that differs from the mobile phone 200). In another example, the other electronic device can be a personal computer.

In Step 520, based upon remote control of the application that runs on the processor of the other electronic device, the processing circuit 110 controls the aforementioned at least one camera module of the electronic device, such as one or more of the camera modules 231 and 232, to capture at least one image such as that mentioned in the example shown in FIG. 1, temporarily stores the aforementioned at least one image in the storage unit 120, and outputs the aforementioned at least one image, for security of the electronic device such as the mobile phone 200.

According to the example shown in FIG. 5, based upon the remote control of the application that runs on the processor of the other electronic device, the processing circuit 110 can output the image data of the aforementioned at least one image to the other electronic device mentioned in Step 510 with packet transmission through at least one of the telecommunication network and the wireless local area network (e.g. the telecommunication network and/or the wireless local area network). This is for illustrative purposes only, and is not meant to be a limitation. According to some variations of the example shown in FIG. 5, based upon some user settings or default settings within the electronic device such as the mobile phone 200 and/or some user settings or default settings of the application within the other electronic device, the application that runs on the processor of the other electronic device may automatically trigger a security procedure such as that mentioned above (e.g. the processing circuit 110 may automatically trigger the security procedure in response to the activation of the remote control function). More particularly, based upon the security procedure, the processing circuit 110 can send an e-mail thorough Internet with the aforementioned at least one image being attached to the e-mail. For example, the processing circuit 110 sends the e-mail from the first predetermined e-mail account to the second predetermined e-mail account, allowing the aforementioned at least one image to be received by utilizing the second predetermined e-mail account through another electronic device (which differs from the electronic device disclosed in the example shown in FIG. 1) such as the workstation mentioned above. In another example, the processing circuit 110 sends the e-mail from the first predetermined e-mail account to the same e-mail account (i.e. the first predetermined e-mail account), allowing the aforementioned at least one image to be received by utilizing the first predetermined e-mail account through another electronic device (which differs from the electronic device disclosed in the example shown in FIG. 1) such as the workstation mentioned above. As a result, the owner of the electronic device such as the mobile phone 200 may find the electronic device with the aid of the aforementioned at least one image received through one or more other electronic devices (e.g. the personal computer, the mobile phone that differs from the mobile phone 200, or the workstation mentioned above).

According to a variation of the example shown in FIG. 5, in a situation where the electronic device such as the mobile phone 200 is picked up by somebody, the security procedure disclosed above can increase the probability of finding the mobile phone 200. For example, based upon some user settings or default settings within the electronic device such as the mobile phone 200 and/or some user settings or default settings of the application within the other electronic device, the application that runs on the processor of the other electronic device may automatically trigger a security procedure such as that mentioned above (e.g. the processing circuit 110 may automatically trigger the security procedure in response to the activation of the remote control function). More particularly, based upon the security procedure, the processing circuit 110 may display a predetermined message (e.g. the message "Please contact the owner whose e-mail address is ABC@DEF.GHI, and a gift is prepared for you.

Thanks!", where "ABC@DEF.GHI" of this variation represents an e-mail address) on the screen of the electronic device (e.g. the screen 240), allowing the person who picks up the electronic device such as the mobile phone 200 to be encouraged to return the electronic device to the owner of the electronic device. As a result, the owner of the electronic device such as the mobile phone 200 may find the electronic device with the aid of the security procedure.

According to another variation of the example shown in FIG. 5, in a situation where the electronic device such as the mobile phone 200 is taken away by somebody, the security procedure disclosed above can increase the probability of finding the mobile phone 200. For example, based upon some user settings or default settings within the electronic device such as the mobile phone 200 and/or some user settings or default settings of the application within the other electronic device, the application that runs on the processor of the other electronic device may automatically trigger a security procedure such as that mentioned above (e.g. the processing circuit 110 may automatically trigger the security procedure in response to the activation of the remote control function). More particularly, based upon the security procedure, the processing circuit 110 may display at least one portion of the aforementioned at least one image on the screen of the electronic device (e.g. the screen 240). More particularly, the processing circuit 110 displays a predetermined message (e.g. the message "Please contact the owner whose e-mail address is ABC@DEF.GHI or inform the police, thanks", where "ABC@DEF.GHI" of this variation represents an e-mail address) on the screen 240, allowing the person who takes away the electronic device such as the mobile phone 200 to simultaneously or non-simultaneously view the predetermined message and his/her own image, which can be an image within the aforementioned at least one image in this variation. As a result, the owner of the electronic device such as the mobile phone 200 may find the electronic device with the aid of the security procedure.

According to some variations of the example shown in FIG. 5, based upon some user settings or default settings within the electronic device such as the mobile phone 200 and/or some user settings or default settings of the application within the other electronic device, the application that runs on the processor of the other electronic device may trigger the processing circuit 110 to activate a screen lock function of the electronic device, such as the screen lock function disclosed in the example shown in FIG. 4, where the trigger signal mentioned in Step 410 is generated (more particularly, automatically generated) based upon remote control of the application that runs on the processor of the other electronic device. Thus, the operations disclosed in the example shown in FIG. 4 (and the variations thereof) can be incorporated into these variations when applicable. Similar descriptions are not repeated in detail for these variations.

Figure 6:
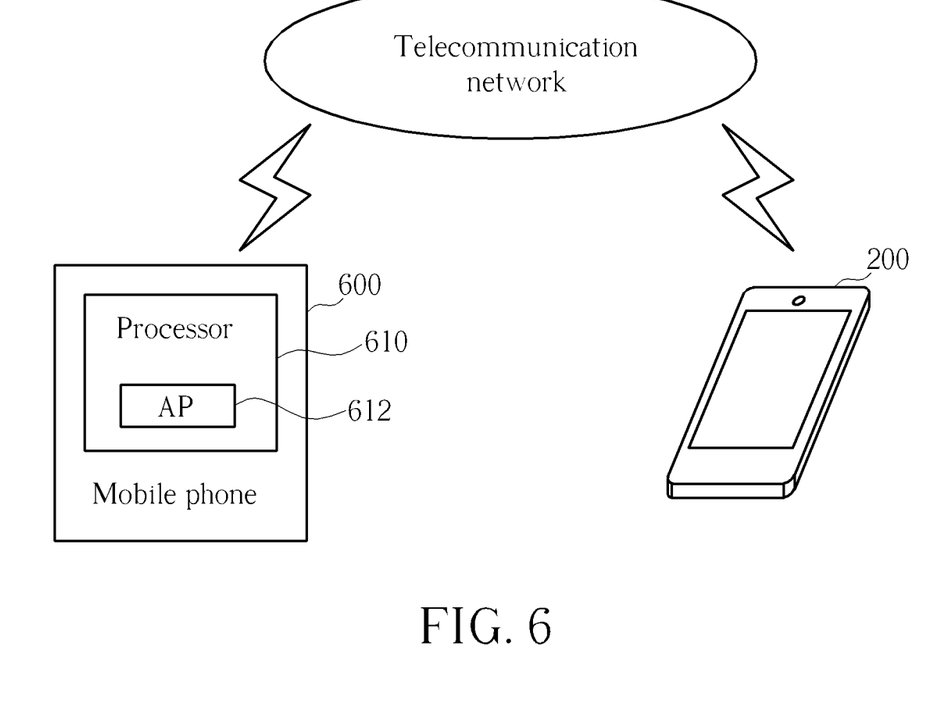
FIG. 6 illustrates a remote control scheme involved with the method shown in FIG. 5 according to an example, where the remote control scheme of this example is implemented with a telecommunication network.

FIG. 6 illustrates a remote control scheme involved with the method 500 shown in FIG. 5 according to an example, where the remote control scheme of this example can be implemented by using a telecommunication network such as that mentioned above. Here, a mobile phone 600 is taken as an example of the other electronic device mentioned in the method 500, where the processor 610 of the mobile phone 600 is taken as an example of the processor of the other electronic device, and the application 612 (labeled "AP" in FIG. 6) is taken as an example of the application that runs on the processor of the other electronic device. Similar descriptions are not repeated in detail for the example shown in FIG. 6.

Figure 7:
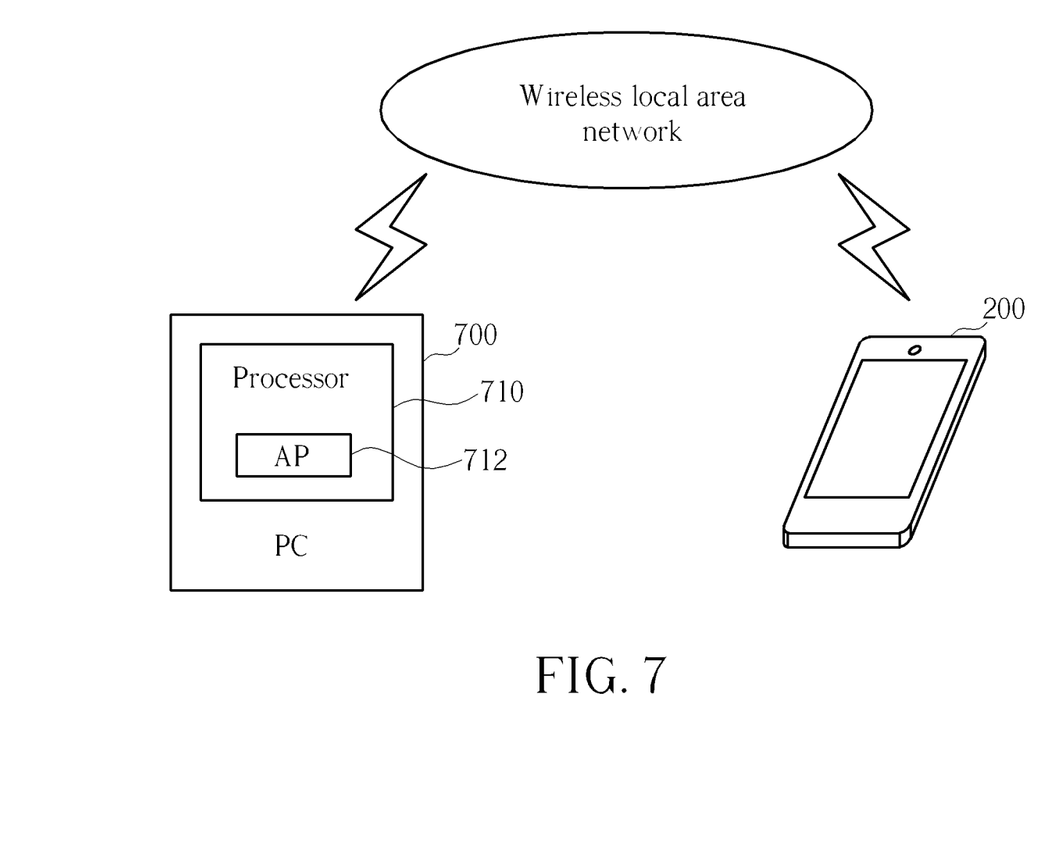
FIG. 7 illustrates a remote control scheme involved with the method shown in FIG. 5 according to another example, where the remote control scheme of this example is implemented with a wireless local area network.

FIG. 7 illustrates a remote control scheme involved with the method 500 shown in FIG. 5 according to another example, where the remote control scheme of this example can be implemented by using a wireless local area network such as that mentioned above. Here, a personal computer 700 (labeled "PC" in FIG. 7) is taken as an example of the other electronic device mentioned in the method 500, where the processor 710 of the personal computer 700 is taken as an example of the processor of the other electronic device, and the application 712 (labeled "AP" in FIG. 7) is taken as an example of the application that runs on the processor of the other electronic device. Similar descriptions are not repeated in detail for the example shown in FIG. 7.

According to an aspect, the aforementioned computer program product can be composed of several code segments. In addition, after these code segments are loaded into the apparatus 100 (more particularly, the processing circuit 110) and are executed, the steps and features of the method shown in FIG. 4 can be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing security control, the method being applied to an electronic device, the method comprising the steps of:
   when a screen lock function of the electronic device is activated, receiving data for accessing the electronic device;
   performing a checking operation by comparing the received data with stored data, the checking operation for determining whether the screen lock function should be deactivated;
   generating a checking result of the checking operation indicating whether or not the received data matches the stored data;
   generating a trigger signal according to the checking result to selectively deactivate the screen lock function of the electronic device; and
   when the checking result of the checking operation indicates that the screen lock function should not be deactivated, controlling at least one camera module of the electronic device to capture at least one image indicating an environment of the electronic device at a time of the generating the checking result of the checking operation and outputting the at least one image so it can be accessed by an authenticated user of the electronic device,
   wherein the screen lock function is associated with at least one of a password, a predetermined drawing pattern, a personal identification number (PIN) code of the electronic device or a biometric operation; and
   wherein the checking result detects at least one of:
   a string that differs from the password is entered to try deactivating the screen lock function;
   a drawing pattern that differs from the pre-determined drawing pattern is input to try deactivating the screen lock function;
   a code that differs from the PIN code of the electronic device is input to try deactivating the screen lock function; or
   a biometric operation that does not match corresponding information that is stored within the electronic device.

2. The method of claim 1, wherein outputting the at least one image further comprises:
sending an electronic mail (e-mail) through the Internet to a domain which can be accessed by the authenticated user of the electronic device with the at least one image being attached to the e-mail.

3. The method of claim 2, wherein outputting the at least one image further comprises:
sending the e-mail from a first predetermined e-mail account to a second predetermined e-mail account, allowing the at least one image to be received by utilizing the second predetermined e-mail account through another electronic device.

4. The method of claim 2, wherein outputting the at least one image further comprises:
sending the e-mail from a first predetermined e-mail account to the first predetermined e-mail account, allowing the at least one image to be received by utilizing the first predetermined e-mail account through another electronic device.

5. The method of claim 1, wherein outputting the at least one image further comprises:
displaying at least one portion of the at least one image on a screen of the electronic device.

6. The method of claim 5, further comprising:
displaying a predetermined message on the screen, allowing a person who enters a string to simultaneously or non-simultaneously view the predetermined message and his/her own image, an image within the at least one image.

7. The method of claim 1, wherein the checking operation comprises at least one biometric checking operation.

8. The method of claim 7, wherein the at least one biometric checking operation comprises at least one of a face recognition operation, an iris recognition operation, a fingerprint recognition operation, or a vein recognition operation.

9. The method of claim 1, further comprising:
displaying a predetermined message on a screen of the electronic device, allowing a person who enters a string to be encouraged to return the electronic device to an owner of the electronic device.

10. The method of claim 1, wherein the screen lock function is associated with a password; and
the step of controlling the at least one camera module of the electronic device to capture the at least one image and outputting the at least one image for security of the electronic device further comprises:
when it is detected that a string that differs from the password is entered to try deactivating the screen lock function, controlling the at least one camera module of the electronic device to capture the at least one image and outputting the at least one image, for security of the electronic device.

11. The method of claim 1, wherein the screen lock function is associated with a predetermined drawing pattern; and
the step of controlling the at least one camera module of the electronic device to capture the at least one image and outputting the at least one image for security of the electronic device further comprises:
when it is detected that a drawing pattern that differs from the predetermined drawing pattern is input to try deactivating the screen lock function, controlling the at least one camera module of the electronic device to capture the at least one image and outputting the at least one image, for security of the electronic device.

12. The method of claim 1, wherein the screen lock function is associated with a personal identification number (PIN) code of the electronic device; and
the step of controlling the at least one camera module of the electronic device to capture the at least one image and outputting the at least one image for security of the electronic device further comprises:
when it is detected that a code that differs from the PIN code is input to try deactivating the screen lock function, controlling the at least one camera module of the electronic device to capture the at least one image and outputting the at least one image, for security of the electronic device.

13. An apparatus for performing security control, the apparatus comprising:
at least one portion of an electronic device;
a storage unit; and
a processing circuit arranged to control operations of the electronic device,
wherein when a screen lock function of the electronic device is activated, the processing circuit receives data for accessing the electronic device, performs a checking operation by comparing the received data with stored data, the checking operation for determining whether the screen lock function should be deactivated, generates a checking result of the checking operation indicating whether or not the received data matches the stored data, and generates a trigger signal according to the checking result to selectively deactivate the screen lock function of the electronic device;
wherein when the checking result of the checking operation indicates that the screen lock function should not be deactivated, the processing circuit controls at least one camera module of the electronic device to capture at least one image indicating an environment of the electronic device at a time of the generating the checking result of the checking operation, temporarily stores image data of the at least one image in the storage unit, and outputs the at least one image, so it can be accessed by an authenticated user of the electronic device, for security of the electronic device;
wherein the screen lock function is associated with at least one of a password, a predetermined drawing pattern, a personal identification number (PIN) code of the electronic device or a biometric operation; and
wherein the checking result detects at least one of:
a string that differs from the password is entered to try deactivating the screen lock function;
a drawing pattern that differs from the pre-determined drawing pattern is input to try deactivating the screen lock function;
a code that differs from the PIN code of the electronic device is input to try deactivating the screen lock function; or
a biometric operation that does not match corresponding information that is stored within the electronic device.

14. The apparatus of claim 13, wherein the processing circuit sends an electronic mail (e-mail) thorough Internet with the at least one image being attached to the e-mail.

15. The apparatus of claim 14, wherein the processing circuit sends the e-mail from a first predetermined e-mail account to a second predetermined e-mail account, allowing the at least one image to be received by utilizing the second predetermined e-mail account through another electronic device.

16. The apparatus of claim 14, wherein the processing circuit sends the e-mail from a first predetermined e-mail account to the first predetermined e-mail account, allowing the at least one image to be received by utilizing the first predetermined e-mail account through another electronic device.

17. The apparatus of claim 13, wherein the processing circuit displays at least one portion of the at least one image on a screen of the electronic device.

18. The apparatus of claim 17, wherein the processing circuit displays a predetermined message on the screen, allowing a person who enters a string to simultaneously or non-simultaneously view the predetermined message and his/her own image, an image within the at least one image.

19. The apparatus of claim 13, wherein the checking operation comprises at least one biometric checking operation; and
the processing circuit utilizes at least one optical input module of the electronic device to input biometric information, for performing the at least one biometric checking operation.

20. The apparatus of claim 19, wherein the at least one optical input module comprises a front camera of the electronic device and/or a specific scanner module of the electronic device; and
the at least one biometric checking operation comprises at least one of a face recognition operation, an iris recognition operation, a fingerprint recognition operation, or a vein recognition operation.

21. The apparatus of claim 13, wherein the processing circuit displays a predetermined message on a screen of the electronic device, allowing a person who enters a string to be encouraged to return the electronic device to an owner of the electronic device.

22. The apparatus of claim 13, wherein the screen lock function is associated with a password; and
when it is detected that a string that differs from the password is entered to try deactivating the screen lock function, the processing circuit controls the at least one camera module of the electronic device to capture the at least one image and outputting the at least one image, for security of the electronic device.

23. The apparatus of claim 13, wherein the screen lock function is associated with a predetermined drawing pattern; and
when it is detected that a drawing pattern that differs from the predetermined drawing pattern is input to try deactivating the screen lock function, the processing circuit controls the at least one camera module of the electronic device to capture the at least one image and outputting the at least one image, for security of the electronic device.

24. The apparatus of claim 13, wherein the screen lock function is associated with a personal identification number (PIN) code of the electronic device; and
when it is detected that a code that differs from the PIN code is input to try deactivating the screen lock function, the processing circuit controls the at least one camera module of the electronic device to capture the at least one image and outputting the at least one image, for security of the electronic device.

25. A method for performing security control, the method being applied to an electronic device, the method comprising:
activating a remote control function of the electronic device based upon a trigger signal, allowing the electronic device to be remotely controlled, through at least one of a telecommunication network and a wireless local area network, by an application that runs on a processor of another electronic device; and
based upon remote control of the application that runs on the processor of the other electronic device, activating a security procedure by controlling at least one camera module of the electronic device to capture at least one image at a time of the security procedure activation and outputting the at least one image so it can be accessed by an authenticated user of the electronic device;
wherein the security procedure further comprises:
activating a screen lock function based upon remote control of the application that runs on the processor of the other electronic device, wherein the screen lock function is associated with at least one of a password, a predetermined drawing pattern, a personal identification number (PIN) code of the electronic device or a biometric operation;
receiving data to try deactivating the screen lock function;
performing a checking operation based upon remote control of the application that runs on the processor of the other electronic device, by comparing the received data with data stored on the other electronic device; and
generating a checking result of the checking operation based upon remote control of the application that runs on the processor of the other electronic device, indicating whether or not the received data matches the data stored on the other electronic device;
wherein the checking result detects at least one of:
a string that differs from the password is entered to try deactivating the screen lock function;
a drawing pattern that differs from the pre-determined drawing pattern is input to try deactivating the screen lock function;
a code that differs from the PIN code of the electronic device is input to try deactivating the screen lock function; or
a biometric operation that does not match corresponding information that is stored within the electronic device.

26. The method of claim 25, wherein outputting the at least one image further comprises:
displaying at least one portion of the at least one image on a screen of the electronic device.

27. The method of claim 26, further comprising:
displaying a predetermined message on the screen, allowing a person to simultaneously or non-simultaneously view the predetermined message and his/her own image, an image within the at least one image.

28. The method of claim 26, further comprising:
in a situation where the remote control function of the electronic device is activated, automatically displaying a predetermined message on the screen, allowing a person to simultaneously or non-simultaneously view the predetermined message and his/her own image, an image within the at least one image.

29. The method of claim 25, wherein outputting the at least one image further comprises:
sending an electronic mail (e-mail) thorough Internet with the at least one image being attached to the e-mail.

30. The method of claim 25, further comprising:
wherein the screen lock function is associated with a password; and
when it is detected that a string that differs from the password is entered to try deactivating the screen lock function, controlling the at least one camera module of the electronic device to capture the image and outputting the image.

31. A computer program product implemented on a non-transitory computer readable medium, having program instructions for instructing a processor of the non-transitory computer readable medium to perform a method comprising the steps of:
- when a screen lock function of the electronic device is activated, receiving data for accessing the electronic device;
- performing a checking operation by comparing the received data with stored data, the checking operation for determining whether the screen lock function should be deactivated;
- generating a checking result of the checking operation indicating whether or not the received data matches the stored data;

generating a trigger signal according to the checking result to selectively deactivate the screen lock function of the electronic device; and
- when the checking result of the checking operation indicates that the screen lock function should not be deactivated, controlling at least one camera module of the electronic device to capture at least one image indicating an environment of the electronic device at a time of the generating the checking result of the checking operation and outputting the at least one image, so it can be accessed by an authenticated user of the electronic device, for security of the electronic device;

wherein the screen lock function is associated with at least one of a password, a predetermined drawing pattern, a personal identification number (PIN) code of the electronic device or a biometric operation; and wherein the checking result detects at least one of:
- a string that differs from the password is entered to try deactivating the screen lock function;
- a drawing pattern that differs from the pre-determined drawing pattern is input to try deactivating the screen lock function;
- a code that differs from the PIN code of the electronic device is input to try deactivating the screen lock function; or
- a biometric operation that does not match corresponding information that is stored within the electronic device.

* * * * *